United States Patent [19]

Offenwanger

[11] Patent Number: 4,979,537
[45] Date of Patent: Dec. 25, 1990

[54] PRESSURE REGULATOR

[75] Inventor: Wolfgang Offenwanger, Ölbronn-Dürrn, Fed. Rep. of Germany

[73] Assignee: Joucomatic S.A., Rueil Malmaison Cedex, France

[21] Appl. No.: 342,514
[22] PCT Filed: Jul. 1, 1988
[86] PCT No.: PCT/FR88/00352
  § 371 Date: Mar. 1, 1989
  § 102(e) Date: Mar. 1, 1989
[87] PCT Pub. No.: WO89/00308
  PCT Pub. Date: Jan. 12, 1989

[30] Foreign Application Priority Data

Jul. 7, 1987 [DE] Fed. Rep. of Germany ....... 3722315

[51] Int. Cl.⁵ .................... G05D 16/06; G05D 16/10
[52] U.S. Cl. .............................. 137/116.5; 137/627.5
[58] Field of Search ......................... 137/116.5, 627.5

[56] References Cited

U.S. PATENT DOCUMENTS

| | | | |
|---|---|---|---|
| 3,071,147 | 1/1963 | Dudzinski | 137/627.5 |
| 3,525,555 | 8/1970 | Meyer | 137/627.5 X |
| 3,730,226 | 5/1973 | Nelson | 137/627.5 |
| 4,077,674 | 3/1978 | Doto | 137/627.5 X |
| 4,096,884 | 6/1978 | Horowitz | 137/627.5 |

Primary Examiner—Robert G. Nilson
Attorney, Agent, or Firm—Pollock, Vande Sande & Priddy

[57] ABSTRACT

A pressure regulator controllable by a proportional magnet includes a valve box with a primary, secondary and deaeration coupling and two valves coaxial with each other and movable in the valve box and controlled by the setting force. The first valve controls a cup-shaped valve seat provided in the valve box for connecting the primary side to the secondary side, and closes it in the rest and deaeration positions, but opens in the working position. The second valve is applied, in the rest and working positions, on a seat surface of the first valve, and prevents any deaeration by the valve in the direction of the deaeration coupling, but in the deaeration and separation positions, clears the passage between this valve and the deaeration coupling. The valve seat surface and the valve surface which cooperates with the cup-shaped valve seat in the valve box are situated in a common diametrical plane and the seat surface is surrounded by the valve surface. The second valve includes, at its end facing the seat surface of the first valve, a second cup-shaped valve seat for bringing the second valve in substantially linear engagement with the seat surface of the first valve surface, and the outer diameter of the second cup-shaped seat corresponds to the inner diameter of the cup-shaped seat of the valve box.

14 Claims, 3 Drawing Sheets

PRESSURE REGULATOR

FIELD OF THE INVENTION

The present invention relates to a pressure regulator which is subjected to the action of a proportional force, for example to that of a proportional magnet, and which includes a valve box which comprises a primary coupling, a secondary coupling and a deaeration coupling and two valve elements which are placed coaxially one with respect to the other, and are guided in a manner so as to be able to move in the valve box and which may be subjected to the action of the setting force. The first valve controls a valve seat in the shape of a cup provided in the valve box and connecting the primary side to the secondary side, and closes it in the rest and deaeration position, and opens it for the passage in the working position, while the second valve element is applied, in the rest position as well as in the working position, on a seat surface of the first valve element, and in the zone of the seat surface, prevents any deaeration by this valve element toward the deaeration coupling but in the deaeration and separation position with the first valve element, clears the passage between this valve element and the deaeration coupling, the seat valve of the first valve element and the valve surface which cooperates with the valve seat in the valve box being situated in a common diametrical plane and the seat surface being inside and surrounded by the valve seat.

BACKGROUND OF INVENTION

A pressure regulator of this type is known, in which the first valve element is constituted by a head mounted at the lower end of a relatively long tubular rod which, at its upper end, is formed with a seat surface for the second valve element which is also in the shape of a valve head and which is subjected from above to the proportional setting force. The second valve element is in the deaeration zone which, in this pressure regulator, has to be necessarily effected upwardly, toward the correction member. The coupling for the secondary pressure is at the lower end of the valve box and is disposed coaxially with respect to the two valve elements. The coupling for the primary pressure is on the axial length between the couplings for the secondary pressure and for the deaeration, and reaches a toroidal chamber. The disadvantage of this known pressure regulator is that it is only usable in the case of nominal passage sections which are not over 6 mm. In this case, the magnitude of the setting force is dependent on the nominal passage section. The larger the nominal passage section, the greater the setting force has to be. The other disadvantage consists in the fact that the deaeration section which is defined by the tubular passage section in the rod is clearly less than the deaeration section. If one uses for example a proportional magnet, proportional magnets of large dimensions which are heavy and relatively costly have to be used in this known pressure regulator.

The object of the invention is a pressure regulator of the type defined in the foregoing, which allows using only reduced setting forces for high pressures and large mid pressure flow rate, and which is adapted in all cases to large nominal passage sections, which may reach for example 20 mm.

According to the invention, this object is reached by using a pressure regulator of the type initially defined, due to the fact that the second valve element includes in the middle of its end which is turned toward the seat surface of the first valve element a valve seat made of a cup, which allows the second valve element to be brought in an engagement which is substantially linear with the seat surface of the first surface element, and that the outer diameter of the cup of the second valve element corresponds to the inner diameter of the valve box cup.

Due to its structure, the pressure regulator according to the invention allows treating high pressures and large flow rates while requiring setting forces which are not very large. When for example the proportional setting force is obtained by means of proportional magnets, the latter can be, due to the invention, extremely small, light in weight, low cost and compact. The further advantage is that in the pressure regulator according to the invention the setting force necessary in each case is completely independent of the nominal passage section provided for the valve. The setting force depends only on the differential pressure surface of the second valve element. This surface may be modified and chosen without difficulty in order to adapt it to circumstances. Another advantage consists in that the pressure regulator also allows a deaeration in a direction which is opposite to that of the correction member, for example of the proportional magnets. Therefore, it becomes possible to place the correction member, notably the proportional magnets, far from the mid-pressure which flows through the pressure regulator and, consequently, to avoid subjecting them to the action of this medium. This is particularly advantageous when one uses aggressive mediums. Another advantage consists in that the deaeration section is exactly the same as the ventilation section.

Other features and advantages will become more apparent from the hereafter description.

The invention is described hereafter in a more detailed manner, by means of embodiments and with reference to the accompanying drawings.

DESCRIPTION OF THE PREFERRED EMBODIMENTS

Figure 1:
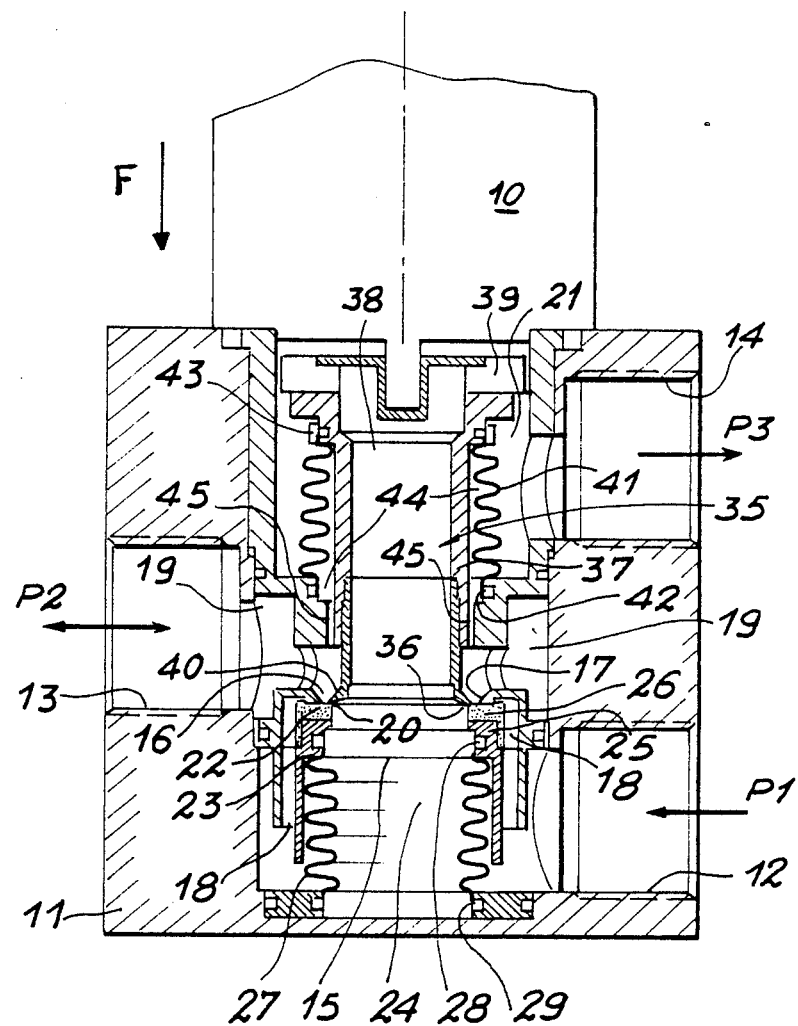
FIG. 1 is a schematic sectional view of a pressure regulator forming a first embodiment and shown in the rest position after having reached the prescribed secondary pressure.
Figure 2:
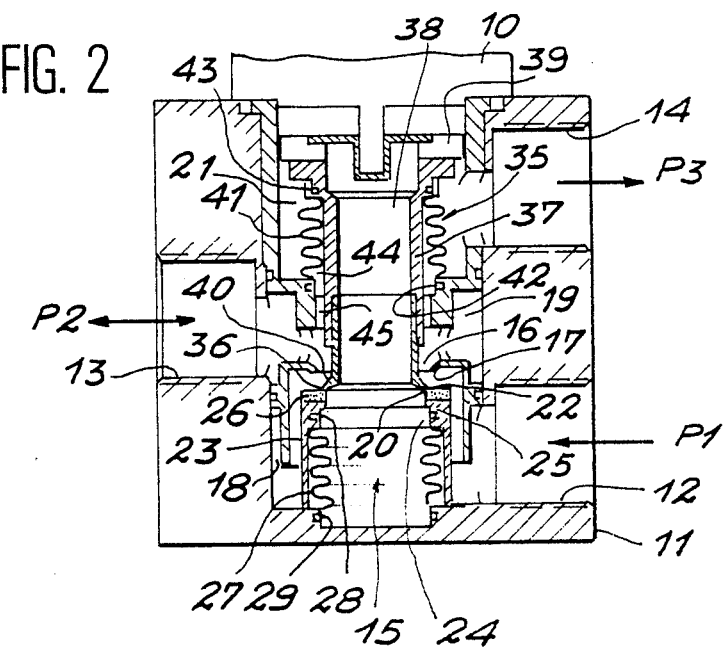
FIG. 2 is a sectional view at a smaller scale corresponding to FIG. 1 and showing the pressure regulator in a working position during setting.
Figure 3:
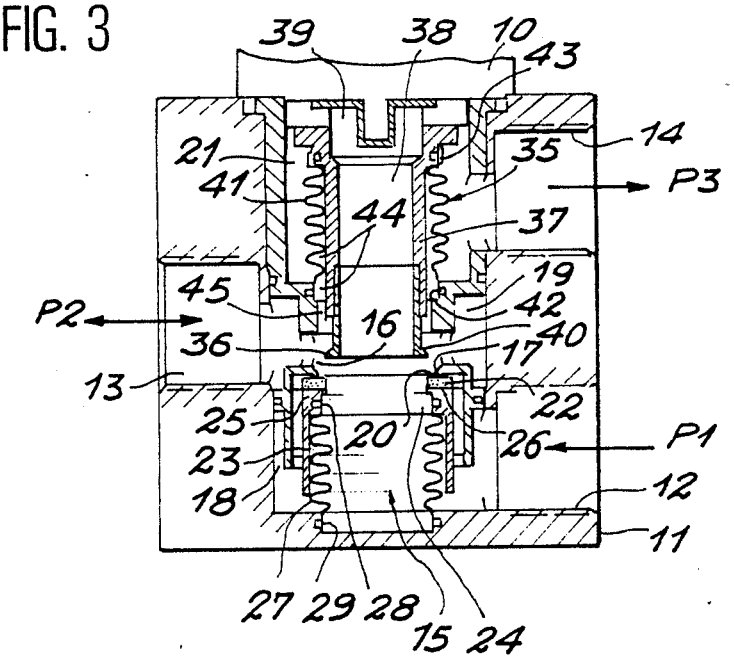
FIG. 3 is a schematic sectional view similar to that of FIG. 2 showing the pressure regulator during the setting operation.

The pressure regulator forming the first embodiment shown in FIGS. 1 to 3 is a valve with a 3/2 way seat. It can be operated by means of a proportional setting force F in order to carry out the setting. The proportional setting force F, of any magnitude, is for example a magnetic force, a resilient force, a pneumatic and/or hydraulic or mechanical force, and acts in the direction of arrow F. It is particularly advantageous that this setting force F is provided by a proportional magnet 10 which, with the pressure regulator, forms the setting device. The pressure regulator is subjected to the action of the electric force, of the proportional magnet 10 acting in the direction of arrow F.

The pressure regulator includes a valve box 11 which comprises three couplings, a coupling 12 for the primary pressure 1, a coupling 13 for the secondary pressure P2 and a coupling 14 for the deaeration P3. In the valve box 11, two valve elements 15 and 35, guided and maintained in a manner such as to be able to move, are placed coaxially one with respect to the other and placed one behind the other on the same axis. The two valve elements 15, 35 may be subjected to the action of the setting force F.

The first valve element 15 controls a valve seat 16 formed by a cup 17 provided in the valve box 11. Cup 17 separates a lower toroidal chamber 18 connected to coupling 12 for the primary pressure P1 from an upper toroidal chamber 19 connected to coupling 13 for the secondary pressure P2. When the valve seat 16 is clear from the first valve element 15 (FIG. 2), the valve seat 16 connects the toroidal chamber 18 situated on the primary side to the toroidal chamber 19 situated on the secondary side. In the rest position shown in FIG. 1 and in the setting or deaeration position shown in FIG. 3, this passage, in the zone of valve seat 16, is closed.

In the rest position shown in FIG. 1 and in the working position shown in FIG. 2, the second valve element 35 bears axially on a seat surface 20 of the first valve element 15 and, in the zone of this seat surface 20, prevents any deaeration of the inside in the direction of the toroidal chamber 21 which is connected to coupling 14 for the deaeration. This seat surface 20 of the first valve element 15 for this second valve element 35 which is situated above and on which the latter may come to bear, is placed in the axial zone of the seat surface 22 of the first valve element 15 which cooperates with the cup 17 of the valve box 11. The seat surface 20 and the seat surface 22 of the first valve element 15 lie in a common diametrical plane. Under these conditions, the seat surface 20 is inside and surrounded by the seat surface 22.

The second surface element 35 includes, at its lower end shown in FIGS. 1 to 3 and turned toward the seat surface 20 of the first valve element 15, a cup 36 constituting the valve seat corresponding to the seat surface 20. This cup 36 allows the second valve element 35 to bear substantially in a linear engagement on the seat surface 20 of the first valve element 15.

While the first valve element 15 is a main piston, the second valve element 35 is a setting piston. The second valve element 35 includes a cylindrical envelope 37 defining an inner chamber 38 opened at its both ends. In the zone of the lower toroidal cup 36, the inner chamber 38 is opened in the axial direction. At its opposite end which, in FIGS. 1 to 3, is at the top, the cylindrical envelope 37 is formed with radial ribs or similar centering devices which define between themselves passages 39 allowing the connection between the inner chamber 38 and the toroidal chamber 21. This arrangement allows providing, via the lower chamber 38 formed in the valve element 35, opened at both its ends, in the ventilation position shown in FIG. 3, a deaeration of the toroidal chamber 19 on the secondary side P2, in the direction of the toroidal chamber 21 and of the deaeration coupling 14.

The first valve element 15 includes a cylindrical envelope 23 which is coaxial with the cylindrical envelope 37 and defines also an inner chamber 24 opened at its both ends. In the embodiment shown, the ventilation is effected by the second valve element 35, in the manner already indicated. However, it is also possible to provide the deaeration by using the first valve element 15, whereby the deaeration can also be carried out from the end of the inner chamber 24 where the seat surface 20 and the valve seat surface 22 are situated, toward the opposite lower end, whereby the valve box 11 has to include in such a case the coupling 14 for the deaeration, situated below the first valve element 15. At the end of the cylindrical envelope 23 which is turned toward the second valve element 35 and which is at the top in FIGS. 1 to 3, the first valve element 15 includes a ring 25 which, on its upper side, carries a seal 26 applied or inserted. Ring 25, and above all seal 26 which it carries, include, on the axial side which is turned toward the second valve element 35, the seat surface 20 for the second valve element 35 and, moreover, the seat surface 22 corresponding to the cup 17 of valve box 11.

The first valve element 15 is provided in a manner such as not to be subjected to the pressure. For so doing, the axial surface acting in the axial direction and subjected to the primary pressure P1 and, in the axial direction, being inside valve box 11 opposite valve seat 16, is at least as large and even slightly larger than the axial surface that is also subjected to the primary pressure P1 and in the axial direction, turned toward the valve seat 16. This sizing provides a differential surface which, under the action of the primary pressure P1, provides a closing force directed in the reverse direction to the setting force F. Moreover, valve element 15 can be provided with a spring acting on it in the closing direction. The first embodiment does not include any spring. The first valve element 15 is isolated from the valve box 11 by bellows 27 which, being metallic, forms at the same time a spring exerting a closing force which is opposite to force F. Bellows 27 is fixed at one of its ends 28 to the first surface element 15 and at its other end 29 to the valve box 11, in a manner which is resistent and pressure-tight.

It is essential that in the second valve element 35, the outer diameter of the cup 36 is equal to the inner diameter of cup 17 provided in the valve seat 16 of valve box 11.

The second valve element 35 is formed with two axial surfaces which may be subjected to the action of the secondary pressure and which, in the case of a pressure application, provide opposed forces in the axial direction. These two surfaces constitute a differential pressure surface which, under the action of the secondary pressure, provides a force of a direction opposite to that of the setting force F for the setting of the secondary pressure P2. One of these surfaces is constituted by the upper side 40 of cup 36, which in FIGS. 1 to 3 is shown in the upper portion. The second surface, of a larger diameter, is provided in the following manner: the second valve element 35 is separated by a seal from the valve box 11 by means of a bellows 41. This bellows 41 is connected in a resistent and tight manner to the lower end 42 of the valve box 11, while the other end, which is the upper end, acts in a resistent and tight manner on the second valve element 35. The two diameters at the ends 42 and 43 of bellows 41 have the same size. They correspond to the median diameters of the bellows. Under these conditions, between the outer side of the cylindrical envelope 37 and bellows 41, there is an inner space 44 which is connected, via a lower space 45 through which the flow can pass in the axial direction and which is provided between the valve box 11 and the cylindrical envelope 37, with the toroidal chamber 19 and, therefore, is subjected to the action of the secondary pressure P2. The bellows 41 closes in a tight way this inner space 44 and at the same time isolates the toroidal chamber 19 situated on the secondary side of the toroidal chamber 21 and of the deaeration coupling 14. The differential surface of the second valve element which partakes to the setting of the secondary pressure P2 and which is designated by reference 35 results from the fact that the median diameter of bellows 41 at end 42 where the connection with valve box 11 is effected is larger than the inner diameter of cup 17 provided in valve box 11. Since the inner diameter of the bellows end 42 is larger than the outer diameter of cup 36 which includes the upper portion 40, there is an axial differential surface which, under the influence of the secondary pressure P2, provides a force of opposite direction to the setting force F.

The mode of operation of the pressure regulator described in this embodiment corresponding to FIGS. 1 to 3 is indicated hereabove. The operation principle of this pressure regulator is based on a comparison of forces.

In the rest position shown in FIG. 1, the electric force F of the proportional magnet 10 acts on the inlet side. On the outlet side acts an opposite force resulting from the secondary pressure P2 and from the described differential pressure surface, that is from the difference between the efficient surfaces of bellows 41 and of the upper side 40. In the rest position shown in FIG. 1, these forces are balanced. In this state, the two valve seats are closed, meaning that on the one hand the valve seat 16 is closed in the valve box 11 due to the fact that the first valve element 15, with the first seat surface 22 oriented in the axial direction, is pushed inside cup 17 so that the connection between the toroidal chamber 18 on the primary side and the toroidal chamber 19 on the secondary side is closed. Likewise, the other valve seat included between the secondary side comprising the toroidal chamber 19 and the toroidal chamber 21 of the deaeration coupling 14 is closed since the second valve element 35, with its cup 36, is applied in the axial direction on the seat surface 20 of the first valve element 15. In this rest position shown in FIG. 1, the secondary pressure P2 is isolated from the primary pressure P1 and from the deaeration.

If one now wishes to obtain a larger secondary pressure P2, one has to increase the setting force when using a proportional magnet 10, for example by an electric setting. The result is that the pressure regulator is moved away from its state of balance shown in FIG. 1. The setting force 1 which, as is shown in FIG. 1, acts from top to bottom upon the second valve element 35, causes a displacement of the second valve element 35 and of the first valve element 15 of FIG. 2. In that case, the cup 36 of the second valve element 35 remains as previously on the axial seat surface 20 of the first valve element 15, so that, as previously, the secondary pressure P2 remains isolated from the deaeration P3. However, the first valve element 15 which includes the valve seat surface 22 moves downwardly as indicated in FIG. 2 in the axial direction in order to be spaced apart downwardly from cup 17 of valve seat 16 situated on the side of the box. The effect of this movement is to set in communication the toroidal chamber 18 situated on the primary side with the toroidal chamber 19 situated on the secondary side. Due to this fact, the medium can flow under the action of the primary pressure P1 from the toroidal chamber 18 situated on the primary side to the toroidal chamber 19 situated on the secondary side, until the secondary pressure P2 as determined by the proportional magnet 10 and its setting force F are reached. Thereafter, the second valve element 35 is pushed upwardly in the axial direction under the action of the secondary pressure force P2 which cooperates with the differential pressure surface and moves in the direction of arrow F in FIG. 2, until the forces are again balanced. Thereafter, the valve element 35 resumes the rest position shown in FIG. 1. The first valve element 15 follows the displacement of the second valve element 35 in the axial direction, in a direction opposite to arrow F, so that the secondary pressure P2 is isolated from the ventilation P3.

If the pressure regulator has to provide a smaller secondary pressure P2, the magnetic force of the proportional magnet 10 has to be reduced. Due to the balance of the forces obtained, the second valve element 35, due to the presence of the differential pressure surface and under the action of the secondary pressure P2 moves upwardly in a direction reverse to that of arrow F in FIG. 3. The first valve element 15 cannot follow this upward movement of the second valve element 35 in FIG. 3, since the first valve element 15 and its valve seat surface 22 are pushed against cup 17 provided in the valve seat on the box side and remain there. The only part which is raised is therefore the second valve element 35 in FIG. 3, which moves away upwardly from the first valve element 15, so that cup 36 moves away upwardly from the seat surface 20 of the first valve element 15. Therefore, the inner chamber 38 of the second valve element 35 opens, at the level of its opened lower end, in the toroidal chamber 19 situated on the secondary side. Due to this fact, the secondary pressure P2 prevailing in the toroidal chamber 19 can escape via the inner chamber 38 of the second valve element 35 by flowing through openings 39 and reaching the toroidal chamber 21 until the force balance is again stabilized. As soon as the prescribed secondary pressure is obtained by this setting device, the pressure regulator resumes its rest position indicated in FIG. 1. One will understand that it is possible to obtain in this manner a complete deaeration of the apparatus used which can be connected to coupling 13.

The instant pressure regulator allows, with very small setting forces F, setting large pressures with large flow rates. Another essential advantage of the device consists in that the setting force of the correction member, for example of the proportional magnet 10, is completely independent of the passage nominal section for which the pressure regulator is designed. Therefore one can provide pressure regulators of this type, usable for nominal passage sections of 20 mm, by using setting forces as small as those intervening for reduced nominal passage sections. Consequently, the setting devices, notably the proportional magnets 10, can be small, light in weight, therefore low in cost and space-saving, so that the pressure regulator assembly is of a low cost, of a light weight, small and compact. Another advantage consists in that the deaeration can be effected at will upwardly in the direction of the proportional magnet 10 or downwardly through the valve box 11. This second solution is particularly advantageous when the space where the proportional magnet 10 operates has to be separated from the medium flowing through the pressure regulator. This is particularly interesting in the case of aggressive mediums to which the proportional magnets 10 should not be exposed. In that case, the second valve element 35 can be made of a solid piston completely enclosed outside, and the deaeration is effected downwardly through the first hollow valve element 15. Since the two valve elements 15 and 35 are isolated by means of a bellows 27 or 31, a friction force resulting from the tight closing of the valve elements does not exist anymore. The valve elements 15, 35 are therefore easy to move, the effect of which is to still further reduce the necessary setting force and, consequently, the size of the proportional magnet 10.

One will understand that the pressure regulator according to the invention, by being different from the first embodiment, may be constituted by a simple opening/closing valve. This result is reached by making the differential pressure surface of the second valve element 35 equal to zero.

Another advantage of the pressure regulator according to the invention consists that it is enough to provide the differential pressure surface of the second valve element 35 with determined dimensions in order to obtain the characteristics required for the pressure regulator. The other constituent elements of the pressure regulator do not have to be modified.

Figure 4:
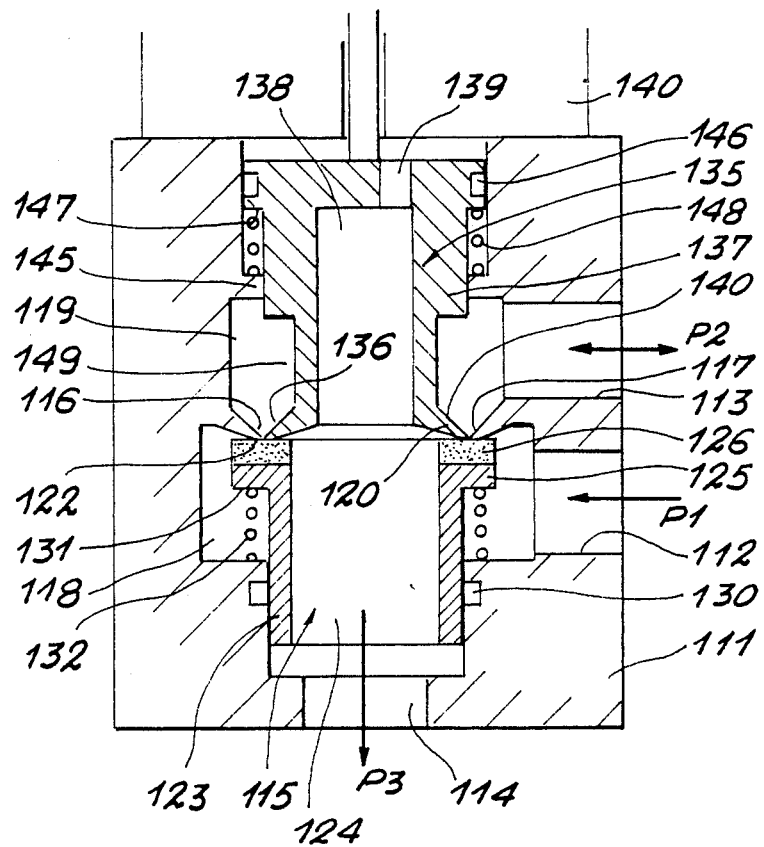
FIG. 4 is a schematic sectional view corresponding substantially to that of FIG. 1 and showing a pressure regulator constituting a second embodiment, in the rest position.

In the second embodiment shown in FIG. 4, the parts corresponding to the first embodiment are designated by reference numbers which are increased by 100 as regards the preceding references, thereby avoiding repetitions with respect to the description of the first embodiment.

In the second embodiment, the cylindrical envelope 123 of the first valve element 115 is closed in a tight manner in valve box 111 by means of an O-ring 130. The outer diameter of the cylindrical envelope 123 of the first valve element 115 corresponds, at least approximately, to the inner diameter of the cup 117 of the valve seat on the box side, so that the first valve element 115 is at least substantially at a balanced pressure. In the embodiment in question, the outer diameter of the cylindrical envelope 123 is somewhat smaller, which provides in the zone of ring 125 carrying seal 126 a larger axial surface 131 on the lower side than on the other axial side where the surface subjected to the action of the primary pressure P1 results from the difference between the outer diameter of ring 125 and of the inner diameter of cup 117 in the valve box 116. Under these conditions, the first valve element 115 has a differential pressure surface which, under the action of the secondary pressure P2, provides a closing force oriented in the axial direction upwardly and which, moreover, is assisted by the force of a spring 132 acting in the same direction. This device provides for the closing of the first valve element 115.

The second valve element 135 is also closed in a tight manner in the valve box 111 by means of an O-ring 146. Under these conditions, the end of the second valve element 135 which carries cup 136 may, as for example in the case of the first embodiment, project in the radial direction beyond the outer peripheral surface of the outer cylindrical envelope, thereby providing, as in the first embodiment, an upper side 140 of the toroidal chamber 119 which is subjected to the secondary pressure P2. Moreover, the second valve element 35 which is at a certain axial distance, for example at the level of its opposite end situated at the top in FIG. 4, can include an axial surface 147 also subjected to the action of the secondary pressure P2 and larger than the upper side 140 acting in the axial direction, which provides a differential pressure surface subjected to the action of the secondary pressure P2. Even when the outer diameter of cup 136 corresponds to the outer diameter of the cylindrical envelope 137, the axial surface 149 extends further in the radial direction and forms therefore the differential surface subjected to the secondary pressure P2. Via the annular space 145, the secondary pressure P2 of toroidal chamber 119 acts also in the zone of the axial surface 147. On the other hand, the second valve element is subjected to the action of a spring 148 which, in FIG. 4, is directed upwardly.

Above the zone of cup 136, the second valve element 135 is formed with an annular groove 149 including equal axial surfaces forming its side walls. The annular groove 149 communicates with toroidal chamber 119. The outer diameter of the cylindrical envelope 137 corresponds in this case at least substantially to the inner diameter of cup 117 of valve seat 116.

The coupling 114 which is used for the deaeration is in that case disposed coaxially to the two valve elements 115, 135. In FIG. 4, the coupling is at the lower end of valve box 111. When the second valve element 135 raises in the reverse direction to that of arrow F in FIG. 4 under the action of the first valve element which is at 115 below it, the deaeration of the secondary pressure P2 is effected via the inner chamber 124 of the first valve element 115, downwardly in the direction of coupling 114. The second valve element 135 can be completely closed in the upper zone and also inside. If one also wishes to provide an extra sweeping of the second valve element 135 by means of the medium, one can provide, as already discussed, the second valve element 135 of the inner chamber 138 which is opened at least with an axial passage 139 in the direction of the upper portion of the second valve element 135. Since the mode of operation of the pressure regulator shown in the second embodiment in FIG. 4 is similar to the first embodiment, it is not necessary to describe it.

What is claimed:

1. A pressure regulator controllable by a proportional force, for example, a proportional magnet comprising:
   a valve box including a primary coupling, a secondary coupling and a deaeration coupling and two valve elements which are coaxial with respect to each other, and movable in the valve box, with the movement being controlled by the action of a setting force;
   said first valve element controlling a cup-shaped valve seat provided in said valve box and connecting a primary side to a secondary side, for closing a passage therebetween in the rest and deaeration positions, and for opening the passage in the working position;
   said second valve element, in the rest and working positions, bearing on a seat surface of said first valve element, and preventing any deaeration by said valve element in the direction of the deaeration coupling, and in the deaeration position and separation from said first valve element, clearing the passage between said valve element and the deaeration coupling, said seat surface of said first valve element and a valve surface which cooperates with said cup-shaped valve seat of said valve box being situated in a common diametrical plane, said seat surface being located inside and surrounded by said valve surface for said cup-shaped valve seat;
   wherein said second valve element includes at its end turned towards said seat surface of said first valve element, a second cup-shaped valve seat which allows for bringing of said second valve element in substantially linear engagement with said seat surface of said first valve element, and wherein the outer diameter of said second cup-shaped valve seat of said second valve element corresponds to the inner diameter of said cup-shaped valve seat of said valve box; and wherein said second valve element is isolated from said valve box by a bellows which, in an inner space defined between said second valve element and the inner side of the bellows, is controlled by a secondary pressure and tightly isolates the inner space from a deaeration space, and wherein a medium diameter of a bellows at the level of the primary coupling of the valve box and at the level of the coupling of the second valve element is larger than the inner diameter of said cup-shaped valve seat of said valve box, whereby a differential pressure surface is provided which allows for setting of the secondary pressure.

2. A pressure regulator according to claim 1, wherein said first valve element includes a cylindrical envelope enclosing an inner chamber, said chamber being opened at both ends and permitting deaeration of the secondary side in the direction of the deaeration coupling in the deaeration position, said deaeration occurring from the end facing said seat surface and the valve seat surface downwardly towards the other end.

3. A pressure regulator according to claim 1, wherein the axial surface of the first valve element which is subjected to the primary pressure and positioned in the axial direction, opposite the cup-shaped valve seat in the valve box, is at least as large as the axial surface of the first valve element which is subjected to the primary pressure and turned in the axial direction towards the valve seat.

4. A pressure regulator according to claim 2, wherein the outer diameter of the cylindrical envelope of the first valve element corresponds to the inner diameter of the cup-shaped valve seat of the valve box.

5. A pressure regulator according to claim 1, wherein the second valve elements includes two surfaces which are situated at a distance from one another in the axial direction to face one another, and are subjected to the action of the secondary pressure, and wherein said two surfaces together form a differential pressure surface allowing for setting of the secondary pressure.

6. A pressure regulator according to claim 4, wherein the second valve element includes two surfaces which are situated at a distance from one another in the axial direction to face one another, and are subjected to the secondary pressure and wherein said two surfaces together form a differential pressure surface allowing for setting of the secondary pressure.

7. A pressure regulator according to claim 5, wherein the end of the second valve element which carries the second cup-shaped seat extends in a radial direction beyond the periphery of a cylindrical envelope which is situated at a distance therefrom in the axial direction of the second valve.

8. A pressure regulator according to claim 1, wherein the first valve element is isolated from the valve box by a bellows which is fixed at one end to the first valve element and at its other end to the valve box.

9. A pressure regulator according to claim 7, wherein the first valve element is isolated from the valve box by a bellows which is fixed at one end to the first valve element and at its other end to the valve box.

10. A pressure regulator according to claim 1, wherein the second valve element includes in its upper portion, which is above the cup-shaped seat, an annular groove having axial surfaces of the same dimensions which form the sides of the groove and wherein the annular groove communicates with a toroidal chamber which includes the secondary coupling.

11. A pressure regulator according to claim 8, wherein the second valve element includes in its upper portion, which is above the cup-shaped seat, an annular groove having axial surfaces of the same dimensions which form the sides of the groove and wherein the annular groove communicates with a toroidal chamber which includes the secondary coupling.

12. A pressure regulator according to claim 10, wherein the second valve includes a cylindrical envelope and wherein the outer diameter of the cylindrical envelope of the second valve element at least substantially corresponds to the inner diameter of the cup-shaped seat of the valve box.

13. A pressure regulator according to claim 8, wherein the second valve element includes in its upper portion an annular radially-extending portion which includes, on its side turned towards the cup-shaped seat of the valve box, a surface which is controlled by the secondary pressure and has a diameter larger than the outer diameter of a cylindrical envelope provided on the second valve element and the inner diameter of the cup-shaped seat of the valve box.

14. A pressure regulator according to claim 10, wherein the second valve element includes in its upper portion an annular radially-extending portion which includes, on its side turned towards the cup-shaped seat of the valve box, a surface which is controlled by the secondary pressure and has a diameter larger than the outer diameter of a cylindrical envelope provided on the second valve element and the inner diameter of the cup-shaped seat of the valve box.

* * * * *